(12) United States Patent
Janicz et al.

(10) Patent No.: US 11,592,003 B2
(45) Date of Patent: Feb. 28, 2023

(54) YAW BRAKING ASSEMBLY OF A WIND TURBINE

(71) Applicant: General Electric Company, Schenectady, NY (US)

(72) Inventors: Aaron P. Janicz, Greenville, SC (US); Ryan Spencer Close, Greenville, SC (US)

(73) Assignee: General Electric Company, Schenectady, NY (US)

( * ) Notice: Subject to any disclaimer, the term of this patent is extended or adjusted under 35 U.S.C. 154(b) by 285 days.

(21) Appl. No.: 16/800,244

(22) Filed: Feb. 25, 2020

(65) Prior Publication Data

US 2021/0262438 A1    Aug. 26, 2021

(51) Int. Cl.
| | | |
|---|---|---|
| F03D 7/02 | (2006.01) |
| F03D 80/50 | (2016.01) |
| F16D 55/02 | (2006.01) |
| F16D 65/092 | (2006.01) |
| F16D 65/16 | (2006.01) |
| F16D 66/02 | (2006.01) |

(Continued)

(52) U.S. Cl.
CPC ............ *F03D 7/0244* (2013.01); *B23P 6/002* (2013.01); *F03D 7/0204* (2013.01); *F03D 80/50* (2016.05); *F16D 55/02* (2013.01); *F16D 65/092* (2013.01); *F16D 65/16* (2013.01); *F16D 66/022* (2013.01); *F03D 17/00* (2016.05); *F05B 2230/80* (2013.01)

(58) Field of Classification Search
CPC .... F03D 7/0204; F03D 7/0208; F03D 7/0212; F03D 7/0244; F03D 17/00; F03D 80/50; F03D 80/70; F05B 2260/902; F05B 2230/80; B23P 6/002; B23P 6/005
See application file for complete search history.

(56) References Cited

U.S. PATENT DOCUMENTS

| | | |
|---|---|---|
| 2,730,779 A | 1/1956 | Schleimer |
| 3,165,764 A | 1/1965 | Christiansen |
| 8,550,769 B2 | 10/2013 | Behnke et al. |

(Continued)

FOREIGN PATENT DOCUMENTS

| | | | |
|---|---|---|---|
| CN | 105402086 A | * | 3/2016 |
| DE | 102011010830 A1 | | 8/2012 |

(Continued)

OTHER PUBLICATIONS

English machine translation of WO-2019/158244-A1, Jul. 11, 2022.*

(Continued)

*Primary Examiner* — Christopher Verdier
(74) *Attorney, Agent, or Firm* — Dority & Manning, P.A.

(57) ABSTRACT

A yaw braking assembly of a wind turbine is presented. Accordingly, the yaw braking assembly includes a bedplate support frame having an annular flange defining a plurality of recesses formed into a lower-most annular surface of the annular flange and extending at least partially through an axial thickness of the annular flange. Each of the plurality recesses define an open exterior circumferential side. The yaw braking assembly also includes a plurality of brake pads which are positioned within the plurality of recesses and configured to engage at least one race of an adjacent yaw bearing. The yaw braking assembly further includes a plurality of actuators for driving the plurality of brake pads to engage the yaw bearing.

20 Claims, 11 Drawing Sheets

(51) Int. Cl.
*B23P 6/00* (2006.01)
*F03D 17/00* (2016.01)

(56) References Cited

U.S. PATENT DOCUMENTS

| | | | |
|---|---|---|---|
| 2010/0038192 A1 | 2/2010 | Culbertson | |
| 2012/0027585 A1 | 2/2012 | Daniels et al. | |
| 2012/0134841 A1* | 5/2012 | Madge | F03D 80/70 416/244 R |
| 2013/0183162 A1* | 7/2013 | Cruden | F03D 80/50 416/244 R |
| 2016/0333860 A1* | 11/2016 | Winslow | F03D 80/70 |
| 2019/0136831 A1 | 5/2019 | Abreu | |

FOREIGN PATENT DOCUMENTS

| | | |
|---|---|---|
| EP | 1650431 A2 | 4/2006 |
| EP | 3483425 | 5/2019 |
| EP | 3499031 A1 | 6/2019 |
| KR | 10-2015-0034893 A * | 4/2015 |
| KR | 10-2015-0092072 A * | 8/2015 |
| KR | 10-2016-0056184 A * | 5/2016 |
| WO | WO2010/112964 A1 | 10/2010 |
| WO | WO 2018/019606 A1 | 2/2018 |
| WO | WO-2019/158244 A1 * | 8/2019 |
| WO | WO-2019/174197 A1 * | 9/2019 |

OTHER PUBLICATIONS

English machine translation of KR-10-2016-0056184-A, Jul. 11, 2022.*
English machine translation of KR-10-2015-0092072-A, Jul. 11, 2022.*
English machine translation of KR-10-2015-0034893-A, Jul. 11, 2022.*
English machine translation of CN-105402086-A, Jul. 11, 2022.*
English machine translation of WO-2019/174197-A1, Jul. 11, 2022.*
European Search Report for EP Application No. 21159379.3, dated Jul. 20, 2021.

* cited by examiner

YAW BRAKING ASSEMBLY OF A WIND TURBINE

FIELD

The present disclosure relates in general to wind turbines, and more particularly to systems and methods for braking a yawing rotation of the nacelle of a wind turbine.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The nacelle includes a rotor assembly coupled to the gearbox and to the generator. The rotor assembly and the gearbox are mounted on a bedplate support frame located within the nacelle. The one or more rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy and the electrical energy may be transmitted to a converter and/or a transformer housed within the tower and subsequently deployed to a utility grid. Modern wind power generation systems typically take the form of a wind farm having multiple such wind turbine generators that are operable to supply power to a transmission system providing power to an electrical grid.

In order to efficiently produce electrical energy, it is typically desirable for the nacelle of the wind turbine to be oriented in aerodynamic alignment with the winds acting on the wind turbine. This is generally accomplished by rotating the nacelle relative to the tower. However, once aerodynamic alignment is achieved, additional rotation of the nacelle relative to the tower must be resisted. The resistance to additional rotation is typically provided via a yaw braking system.

The yaw braking systems of modern wind turbines are typically cylindrical in nature and are inserted through the bedplate support frame. The yaw braking systems typically utilize the top surface of the yaw bearing as the braking friction surface and the bedplate support frame as the mounting structure for the braking load actuating unit. However, this configuration has several known drawbacks. For example, during the braking of the nacelle, loads in sheer, axial, torque, and moment directions are generated and can be transferred to the internal components of the actuation unit, causing damage. Additionally, the circular nature of the brake pads often facilitates the spinning of the brake pads during actuation. It is common for the spinning of the brake pads to result in a decreased braking effectiveness, pad-edge cracking, loosening, and actuator component wear/damage. Additionally, due to the likelihood of spinning, the incorporation of wear sensors into the brake pads has proven quite problematic, which leads to brake pad servicing on a schedule, rather than when necessitated by actual conditions. Further, because the yaw braking systems are typically inserted through the bedplate support frame, servicing of the brake pads requires the disassembly of the yaw braking system in order to remove and access the brake pads.

Thus, the art is continuously seeking new and improved systems to control the yawing rotation of the nacelle of a wind turbine. Accordingly, the present disclosure is directed to a yaw braking assembly which overcomes the drawbacks of the previous yaw braking assemblies.

BRIEF DESCRIPTION

Aspects and advantages of the invention will be set forth in part in the following description, or may be obvious from the description, or may be learned through practice of the invention.

In one aspect, the present disclosure is directed to a yaw braking assembly of a wind turbine. The braking assembly may include a yaw bearing. The yaw braking assembly may also include a bedplate support frame having an annular flange arranged adjacent to the yaw bearing. The annular flange may define a plurality of recesses formed into a lower-most annular surface of the annular flange and extending at least partially through an axial thickness of the annular flange. Each of the plurality of recesses may define an open exterior circumferential side. Additionally, the yaw braking assembly may include a plurality of brake pads positioned within the plurality of recesses. Each of the plurality of brake pads may be configured to engage at least one race of the yaw bearing. Further, the yaw braking assembly may include a plurality of actuators for driving the plurality of brake pads to engage the at least one race of the yaw bearing so as to resist a yawing of a nacelle of the wind turbine.

In an embodiment, the yaw braking assembly may also include a plurality of arm members positioned within a corresponding plurality of holes through the annular flange between the plurality of actuators and the plurality of brake pads. The plurality of arm members may be oriented to transfer a force from the plurality of actuators to the plurality of brake pads.

In an embodiment, each of the plurality of brake pads may have a non-circular shape.

In an additional embodiment, each of the plurality of brake pads may have at least one of a polygonal a shape, a curvilinear polygonal shape, or a rounded-square planform.

In a further embodiment, each of the plurality of brake pads may define a maximal length and a maximal width. The maximal length may be greater than the maximal width.

In an embodiment, each open, exterior circumferential side of the plurality of recesses may define a circumferential length which is greater than the maximal length of the corresponding brake pad.

In an additional embodiment, only one of the plurality of brake pads may be positioned within each of the plurality of recesses.

In an embodiment, the plurality of recesses and corresponding plurality of brake pads may be distributed circumferentially about the annular flange in a plurality of adjacent pair sets.

In an additional embodiment, a single actuator may be operably coupled to each of the plurality of pair sets.

In a further embodiment, the plurality of brake pads may be radially aligned with an outer race of the yaw bearing.

In an embodiment, the yaw braking assembly may also include a retention bracket secured to the exterior circumferential side. The retention bracket may occlude at least one of the circumferential openings.

In an additional embodiment, at least one of the plurality of brake pads may also include at least one sensor configured to generate an alert relating to a wear level of one or more of the plurality of brake pads.

In a further embodiment, the sensor(s) may include a continuity sensor.

In an embodiment, the plurality of brake pads may be accessible from outside of the bedplate support frame via the corresponding circumferential openings.

In an additional embodiment, each of the plurality of brake pads may be formed with at least one extraction feature. The extraction feature may be positioned so as to facilitate the removal of each of the brake pads from the corresponding recesses.

In another aspect, the present disclosure is directed to a wind turbine. The wind turbine may include a tower. The wind turbine may also include a nacelle mounted atop the tower. The nacelle may include a bedplate support frame. The bedplate support frame may include an annular flange. The annular flange may define a plurality of recesses formed into a lower-most annular surface of the annular flange and extending at least partially through an axial thickness of the annular flange. Each of the plurality of recesses may define an open, exterior circumferential side. The wind turbine may include a yaw bearing arranged adjacent to the annular flange. Further, the wind turbine may include a rotor mounted to the nacelle. The rotor may include a rotatable hub having one or more rotor blades secured thereto. Additionally, the wind turbine may include a plurality of brake pads positioned within the plurality of recesses. Each of the plurality of brake pads may be configured to engage at least one race of the yaw bearing. The wind turbine may also include a plurality of actuators for driving the plurality of brake pads to engage the at least one race of the yaw bearing so as to resist a yawing of a nacelle of the wind turbine. It should be understood that the system may further include any of the additional steps and/or features described herein.

In another aspect, the present disclosure is directed to a method for servicing a yaw braking assembly of a wind turbine. The method may include accessing at least one brake pad of a plurality of brake pads via an open, exterior circumferential side of a recess defined by at least one of a plurality of recesses formed into a lower-most annular surface of an annular flange of a bedplate support frame and extending at least partially through an axial thickness of the annular flange, wherein the lower-most annular surface is disposed adjacent to a yaw bearing of the wind turbine. The method may also include passing the at least one brake pad through the open, exterior circumferential side of the recess while retaining a corresponding actuator of a plurality of actuators in an assembled configuration. It should be understood that the system may further include any of the additional steps and/or features described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
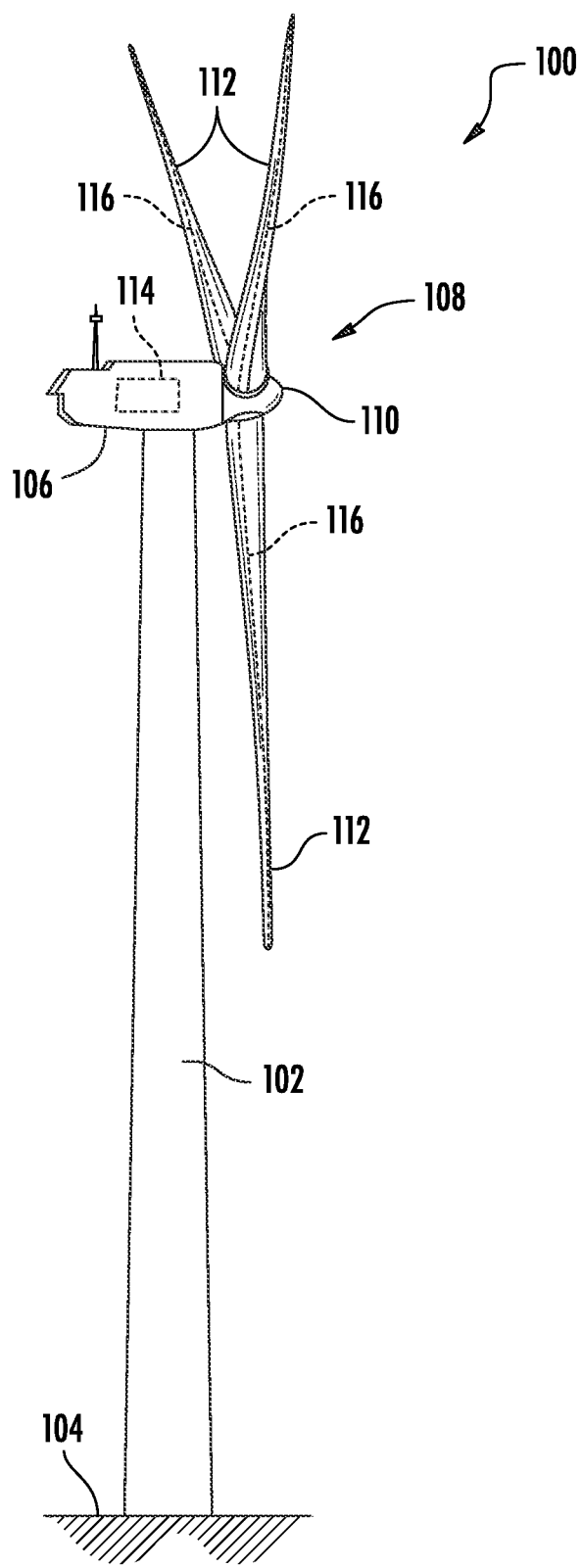
FIG. 1 illustrates a perspective view of one embodiment of a wind turbine according to the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "coupled," "fixed," "attached to," and the like refer to both direct coupling, fixing, or attaching, as well as indirect coupling, fixing, or attaching through one or more intermediate components or features, unless otherwise specified herein.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Generally, the present disclosure is directed to a yaw braking assembly of a wind turbine. In particular, the yaw braking assembly of the present disclosure may include a bedplate support frame having an annular flange. The annular flange may be formed with a plurality of recesses formed into a lower-most annular surface of the annular flange. The recesses may extend at least partially through an axial thickness of the flange and may define an opening in the exterior circumferential side of the annular flange. In other words, each of the recesses may have two open sides through which a corresponding brake pad may pass. One opening may be in the lower-most annular surface of the annular flange and may facilitate the brake pad's engagement with a braking friction surface, such as a yaw bearing. The second opening may be in the exterior circumferential side of the annular flange and may facilitate access to the brake pad without requiring that the yaw braking assembly be disassembled.

The brake pads inserted into each of the recesses may have a non-circular shape. For example, the brake pads may have a polygonal shape, a curvilinear polygonal shape, or a rounded-square planform. Being formed with a non-circular shape, the brake pads may interface with the recesses so as to transfer loads generated during braking to the bedplate support frame, rather than to the actuator components of the yaw braking assembly. It should be appreciated that because the brake pads interface with the recesses, the brake pads may be prevented from spinning during braking operations. This, in turn, may increase the braking effectiveness of the yaw braking assembly and may facilitate the inclusion of a wear sensor with the brake pads.

Referring now to the drawings, FIG. 1 illustrates a perspective view of one embodiment of a wind turbine 100 according to the present disclosure. As shown, the wind turbine 100 generally includes a tower 102 extending from a support surface 104, a nacelle 106, mounted on the tower 102, and a rotor 108 coupled to the nacelle 106. The rotor 108 includes a rotatable hub 110 and at least one rotor blade 112 coupled to and extending outwardly from the hub 110. For example, in the illustrated embodiment, the rotor 108 includes three rotor blades 112. However, in an alternative embodiment, the rotor 108 may include more or less than three rotor blades 112. Each rotor blade 112 may be spaced about the hub 110 to facilitate rotating the rotor 108 to enable kinetic energy to be transferred from the wind into usable mechanical energy, and subsequently, electrical energy. For instance, the hub 110 may be rotatably coupled to an electric generator 118 (FIG. 2) positioned within the nacelle 106 to permit electrical energy to be produced.

The wind turbine 100 may also include a turbine controller 114 centralized within the nacelle 106. However, in other embodiments, the turbine controller 114 may be located within any other component of the wind turbine 100 or at a location outside the wind turbine. Further, the turbine controller 114 may be communicatively coupled to any number of the components of the wind turbine 100 in order to control the components. As such, the turbine controller 114 may include a computer or other suitable processing unit. Thus, in several embodiments, the turbine controller 114 may include suitable computer-readable instructions that, when implemented, configure the turbine controller 114 to perform various different functions, such as receiving, transmitting and/or executing wind turbine control signals.

Figure 2:
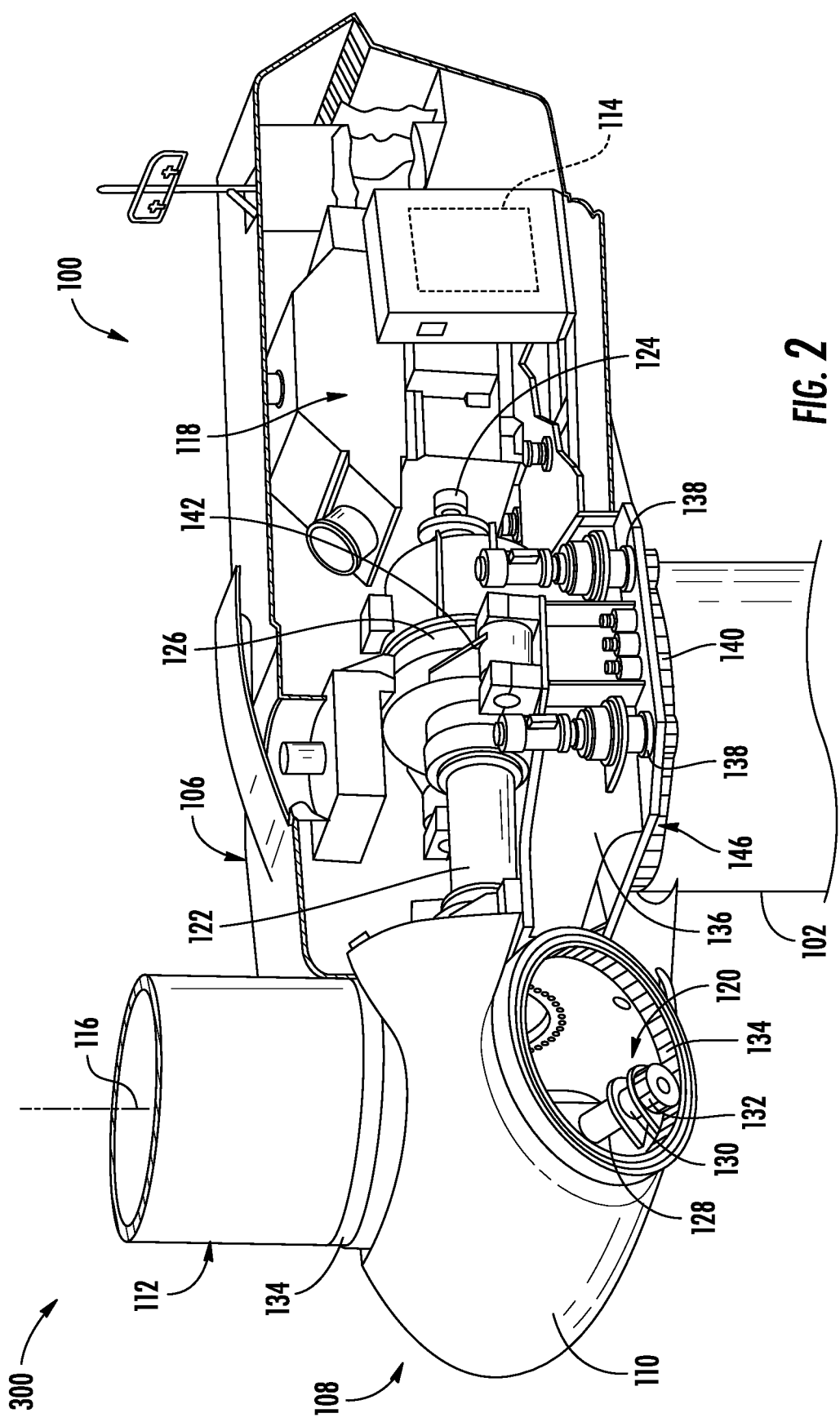
FIG. 2 illustrates a perspective, internal view of one embodiment of a nacelle of a wind turbine according to the present disclosure.

Referring now to FIG. 2, a simplified, internal view of one embodiment of the nacelle 106 of the wind turbine 100 shown in FIG. 1 is illustrated. As shown, the generator 118 may be coupled to the rotor 108 for producing electrical power from the rotational energy generated by the rotor 108. For example, as shown in the illustrated embodiment, the rotor 108 may include a rotor shaft 122 coupled to the hub 110 for rotation therewith. The rotor shaft 122 may be rotatably supported by a main bearing. The rotor shaft 122 may, in turn, be rotatably coupled to a high-speed shaft 124 of the generator 118 through a gearbox 126 connected to a bedplate support frame 136 by one or more torque arms 142. As is generally understood, the rotor shaft 122 may provide a low-speed, high-torque input to the gearbox 126 in response to rotation of the rotor blades 112 and the hub 110. The gearbox 126 may then be configured to convert the low-speed, high-torque input to a high-speed, low-torque output to drive the high-speed shaft 124 and, thus, the generator 118. In an embodiment, the gearbox 126 may be configured with multiple gear ratios so as to produce varying rotational speeds of the high-speed shaft for a given low-speed input, or vice versa.

Each rotor blade 112 may also include a pitch control mechanism 120 configured to rotate each rotor blade 112 about its pitch axis 116. The pitch control mechanism 120 may include a pitch controller configured to receive at least one pitch setpoint command from the turbine controller 114. Further, each pitch control mechanism 120 may include a pitch drive motor 128 (e.g., any suitable electric, hydraulic, or pneumatic motor), a pitch drive gearbox 130, and a pitch drive pinion 132. In such embodiments, the pitch drive motor 128 may be coupled to the pitch drive gearbox 130 so that the pitch drive motor 128 imparts mechanical force to the pitch drive gearbox 130. Similarly, the pitch drive gearbox 130 may be coupled to the pitch drive pinion 132 for rotation therewith. The pitch drive pinion 132 may, in turn, be in rotational engagement with a pitch bearing 134 coupled between the hub 110 and a corresponding rotor blade 112 such that rotation of the pitch drive pinion 132 causes rotation of the pitch bearing 134. Thus, in such embodiments, rotation of the pitch drive motor 128 drives the pitch drive gearbox 130 and the pitch drive pinion 132, thereby rotating the pitch bearing 134 and the rotor blade(s) 112 about the pitch axis 116.

Figure 3:
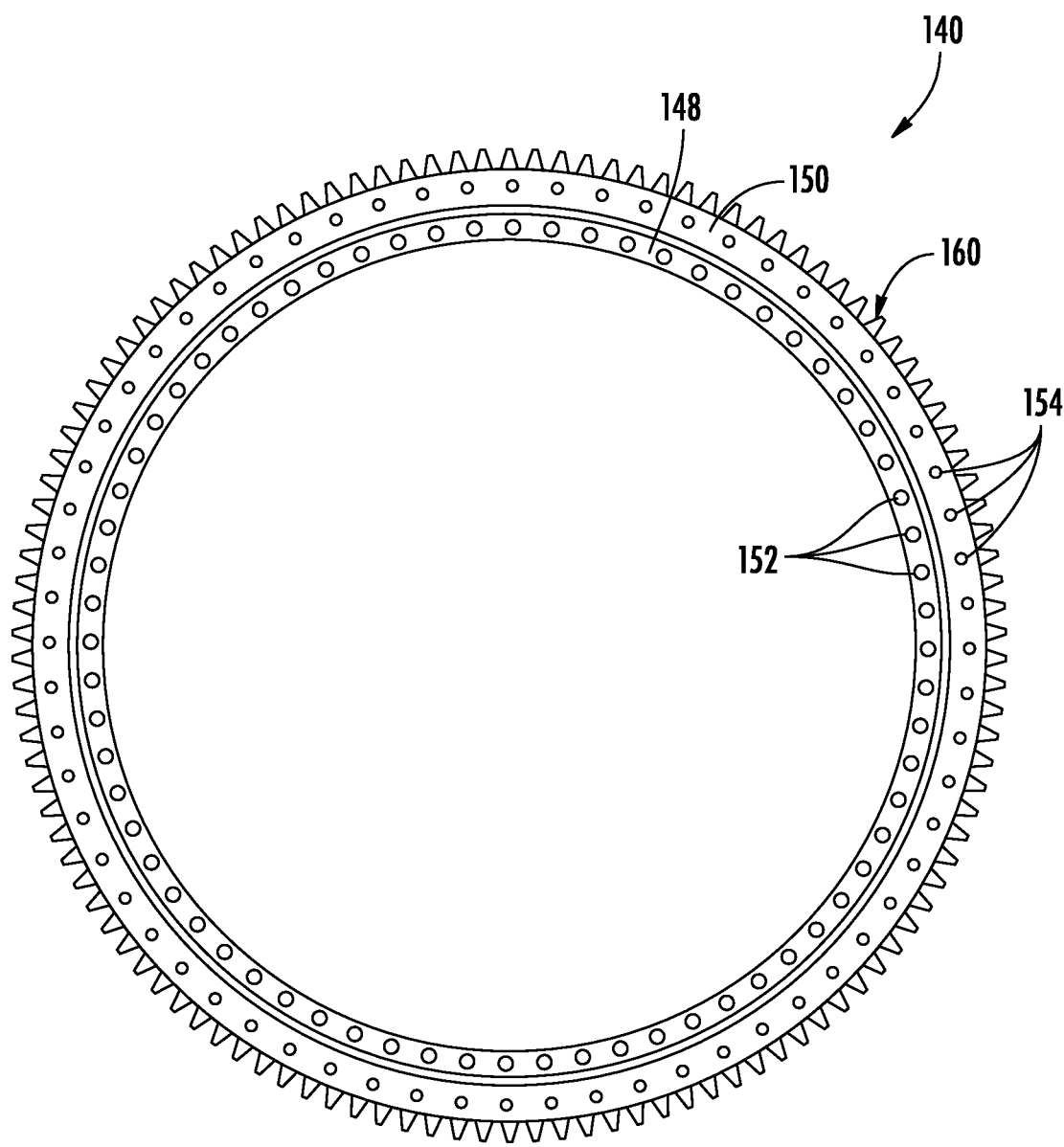
FIG. 3 illustrates a top view of one embodiment of a yaw bearing of a wind turbine according to the present disclosure.

The wind turbine 100 may also include one or more yaw drive mechanisms 138 communicatively coupled to the controller 114. Each yaw drive mechanism(s) 138 may be configured to change the angle of the nacelle 106 relative to the wind by engaging a yaw bearing 140 of the wind turbine 100. The yaw bearing 140 may couple the tower 102 and nacelle 106 at a yaw bearing interface 146. For example, as shown in FIG. 3, the yaw bearing 140 may include an inner race 148 and an outer race 150. As such, the inner race 148 of the yaw bearing 140 may be mounted to the bedplate support frame 136, whereas the outer race 150 of the yaw bearing 140 may be mounted to the tower 102 or vice versa. Mounting may be facilitated through the use of suitable mechanical fasteners, such as nut-bolt combinations, screws, nails, rivets, or other suitable mechanical fastening devices, or through a suitable adhesive, or through a suitable mounting technique such as welding or brazing. In an exemplary embodiment, the inner race 148 may have an inner race hole pattern 152 corresponding to a matching hole pattern in the bedplate support frame 136. Similarly, the outer race 150 may have an outer race hole pattern 154 that corresponds to a matching hole pattern atop the tower 102. In exemplary embodiments, rotation of the yaw bearing 140, such as the rotation of the inner race 148 with respect to the outer race 150, may cause the nacelle 106 to rotate with respect to the tower 102. It should be appreciated that in at least one embodiment, the yaw bearing 140 may be formed with a single race 148, 150 and the tower 102 may serve as the other race.

Figure 4:
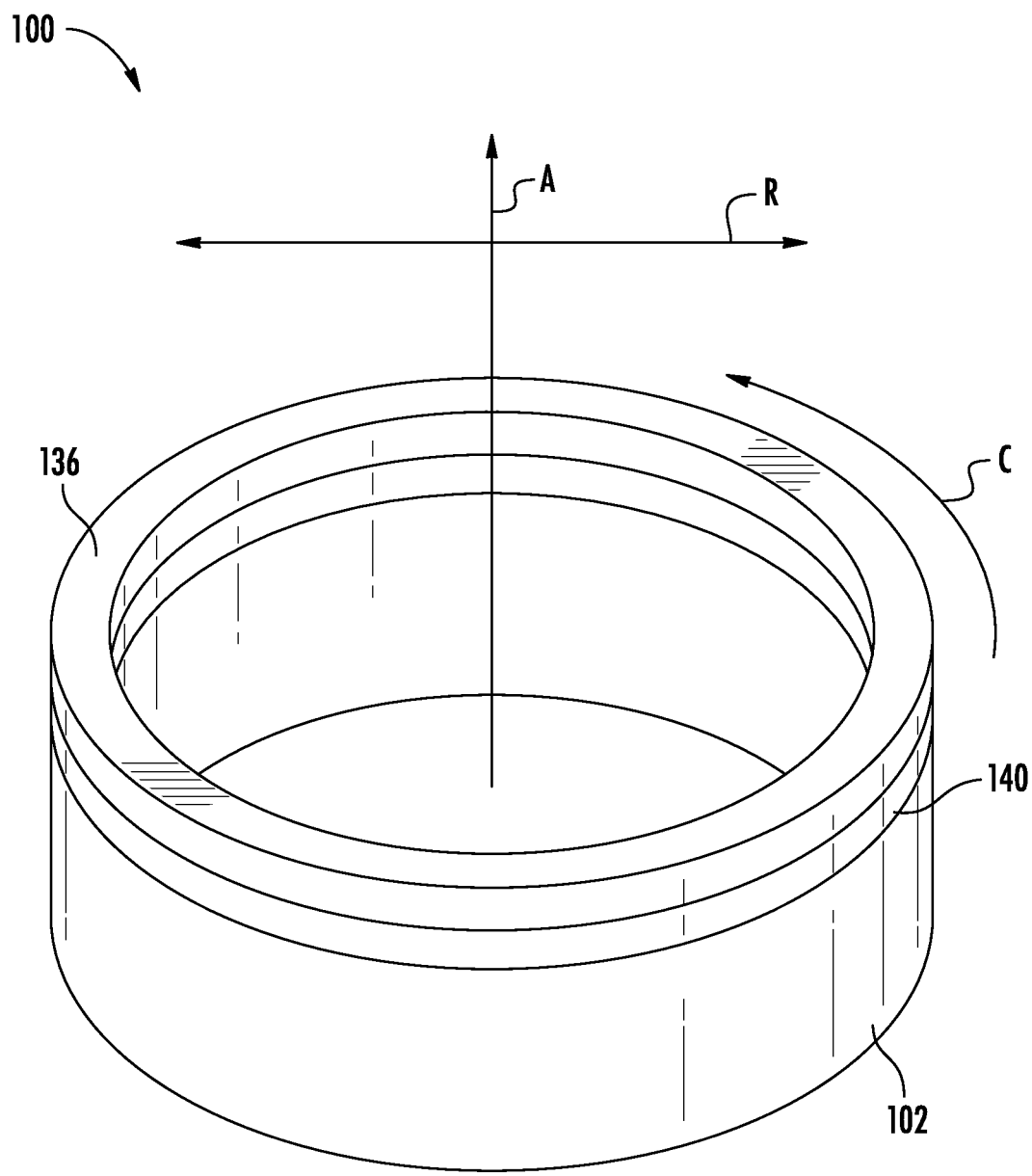
FIG. 4 illustrates a perspective view of a portion of a wind turbine tower according to the present disclosure.

As depicted in FIG. 4, in an embodiment, a reference system may be defined with respect to the wind turbine 100. In such an embodiment, an axis (A) may be defined which is essentially parallel to a centerline of the tower 102 and perpendicular to the support surface 104. The axis (A) may define the axial direction of the wind turbine 100 such that the term "axially" refers to a position, dimension, translation, or movement along, or in reference to, the axis (A). The axis may be intersected by a plane (R). The plane (R) may be oriented essentially perpendicular to the axis (A) and may define a radial direction as used herein. As such, the term "radially" refers to a position, dimension, translation, or movement along, or in reference to, a radius relative to the axis (A). Additionally, an arc (C) may be defined along the plane (R) so as to define a circumferential position, dimension, translation, or movement.

Figure 5:
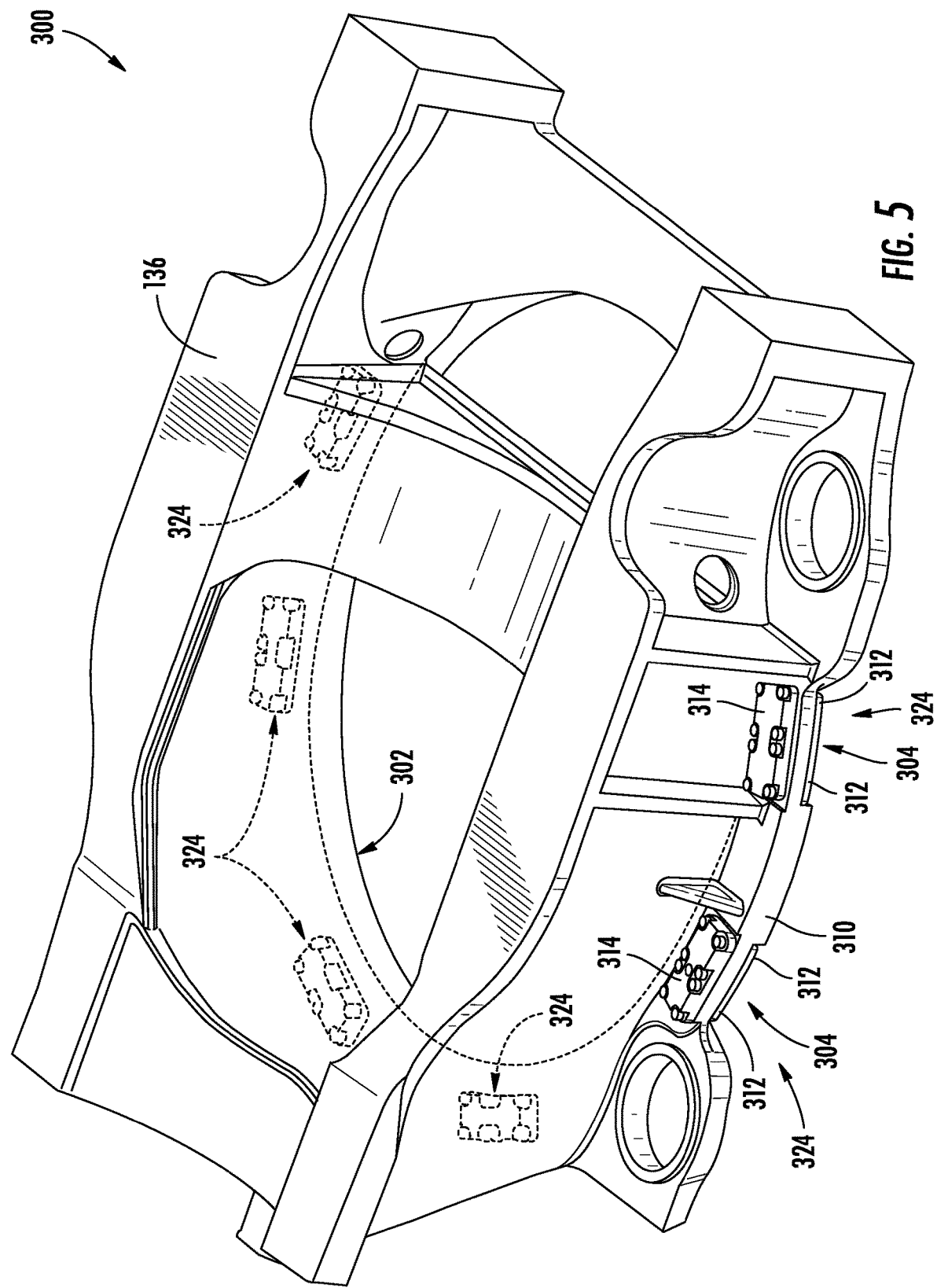
FIG. 5 illustrates a perspective view of a bedplate support frame for utilization with a yaw braking assembly according to the present disclosure.

Referring now to FIG. 5-12B, wherein multiple embodiments of the yaw braking assembly 300 are presented. As shown in FIG. 5, the bedplate support frame 136 may include an annular flange 302. The annular flange 302 may, as depicted in FIG. 2, be arranged adjacent to the yaw bearing 140 along the yaw bearing interface 146. As is particularly illustrated in FIG. 7A, in an embodiment, the annular flange 302 may define a plurality of recesses 304 formed into a lower-most annular surface 306 of the annular flange 302. The plurality of recesses 304 may extend at least partially through an axial thickness ($A_T$) of the annular flange 302. Each of the plurality of recesses 304 may define an open, exterior circumferential side 308. In other words, each of the recesses 304 may define an opening in an exterior circumferential side 310 of the annular flange 302. In an embodiment, the yaw braking assembly 300 may also include a plurality of brake pads 312 positioned within the plurality of recesses 304. The plurality of brake pads 312 may be configured to engage at least one race 148, 150 of the yaw bearing 140. For example, in at least one embodiment, the plurality of brake pads 312 may be radially aligned with the outer race 150 of the yaw bearing 140. Additionally, the yaw braking assembly 300 may include a plurality of actuators 314 for driving plurality of brake pads 312 to engage the yaw bearing 140 and resist a yawing of the nacelle 106 of the wind turbine 100.

Figure 7A:
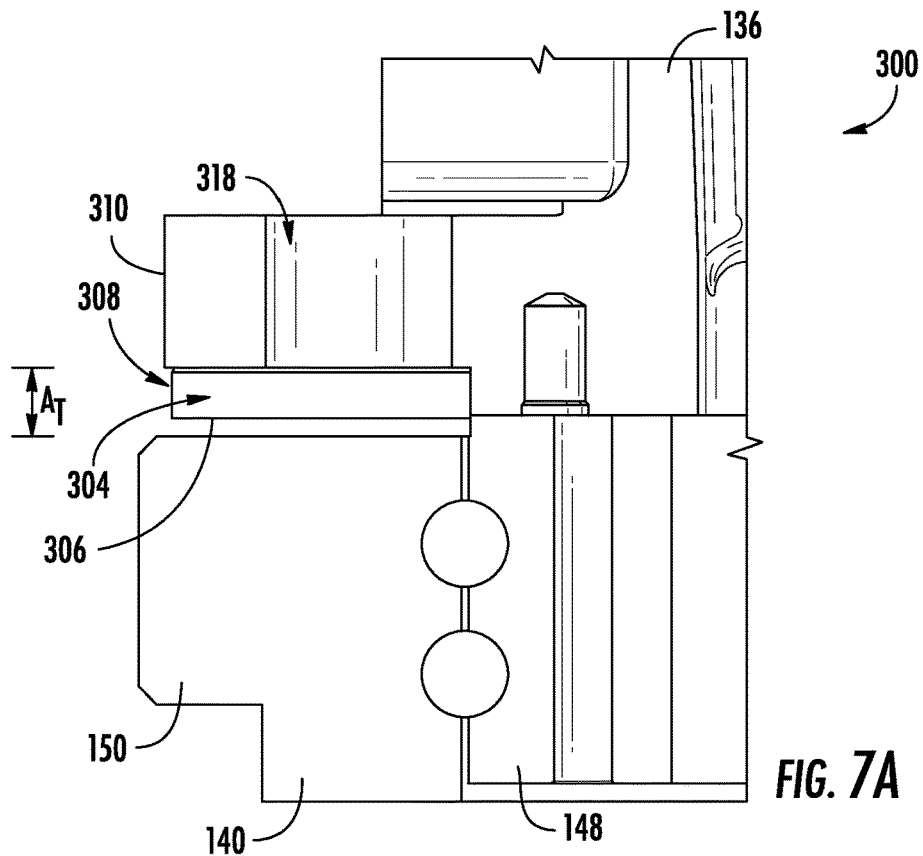
FIGS. 7A and 7B illustrate cross-sectional views of a portion of the bedplate support frame of FIG. 5 according to the present disclosure.
Figure 7B:
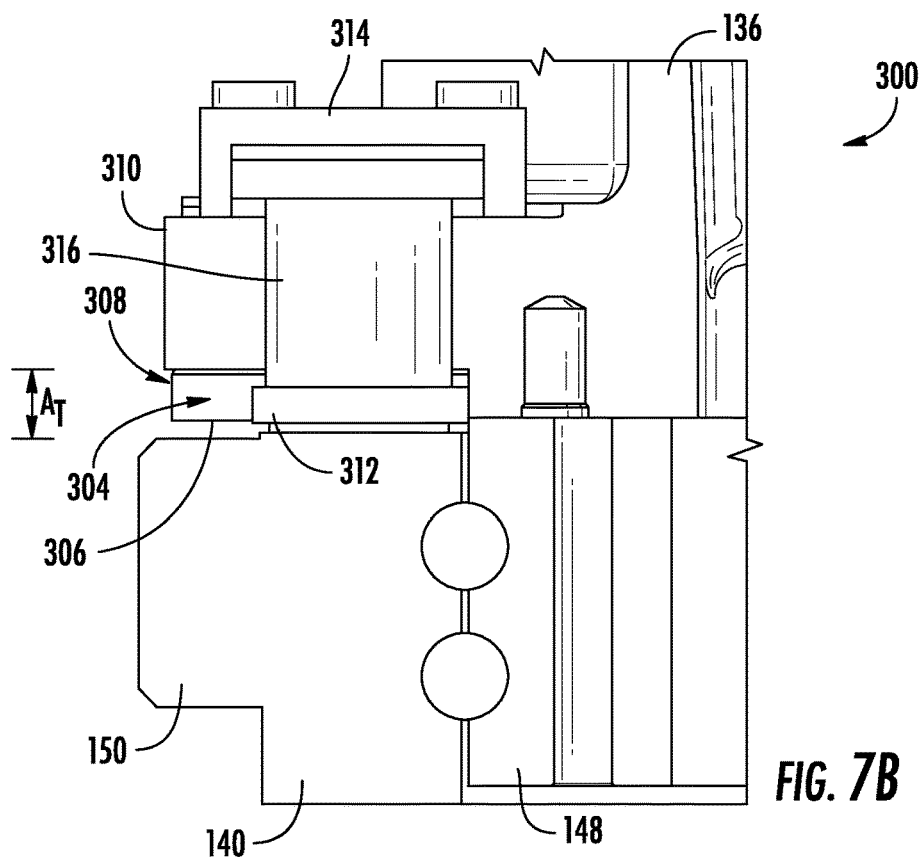

As is particularly depicted in FIGS. 7A and 7B, in at least one embodiment, the yaw braking assembly 300 may include a plurality of arm members 316 positioned within a corresponding plurality of holes 318 through the annular flange 302. The holes 318 may be positioned between the plurality of actuators 314 and the plurality of brake pads 312. In an embodiment, the plurality of arm members 316 may be oriented to transfer a force from the plurality of actuators 314 to the plurality of brake pads 312. In other words, the plurality of arm members 316 may operably couple the plurality of brake pads 312 to the corresponding plurality of actuators 314.

In an embodiment, the brake pads 312 may include a wear layer 320 coupled to a backer plate 322. The wear layer 320 may be configured to engage the yaw bearing 140 and develop a friction therewith. As such, the wear layer 320 may be any suitable material selected based on wear characteristics and heat tolerance. The backer plate 322 may be a rigid/semi-rigid material, such as steel, configured to increase the ability of the wear layer 320 to resist structural loading.

Figure 8:
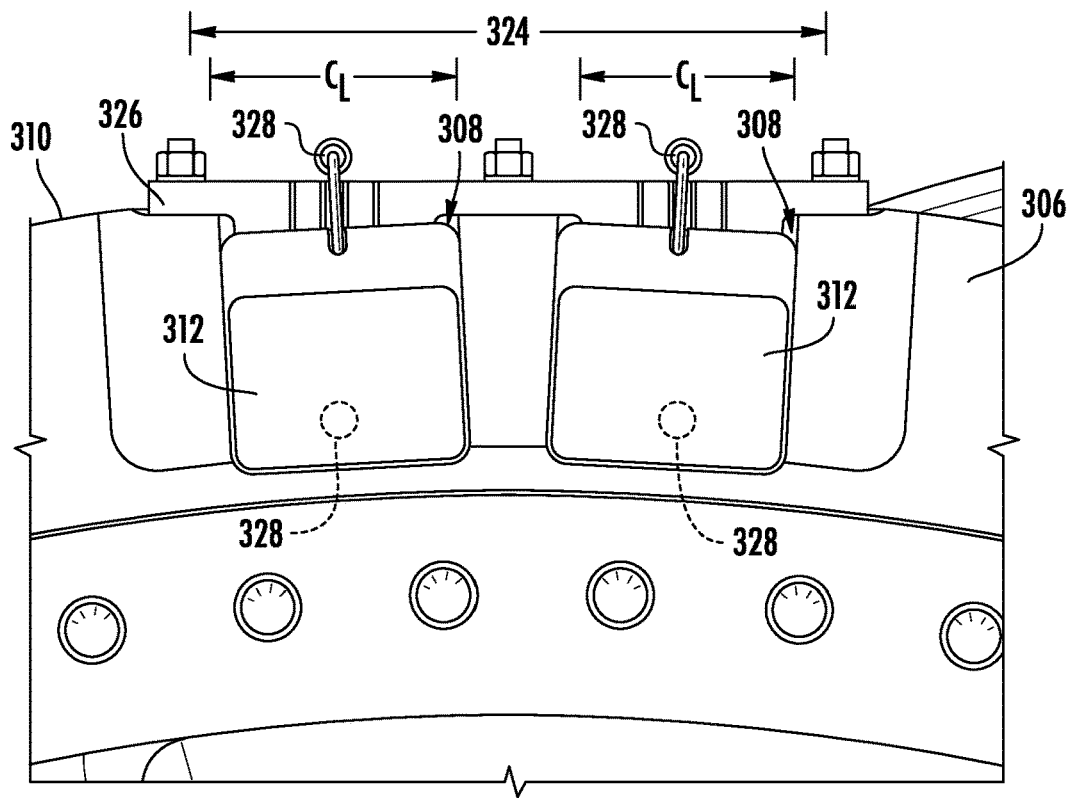
FIG. 8 illustrates a bottom view of a portion of the lower-most annular face of the bedplate support frame of FIG. 5 according to the present disclosure.
Figure 9:
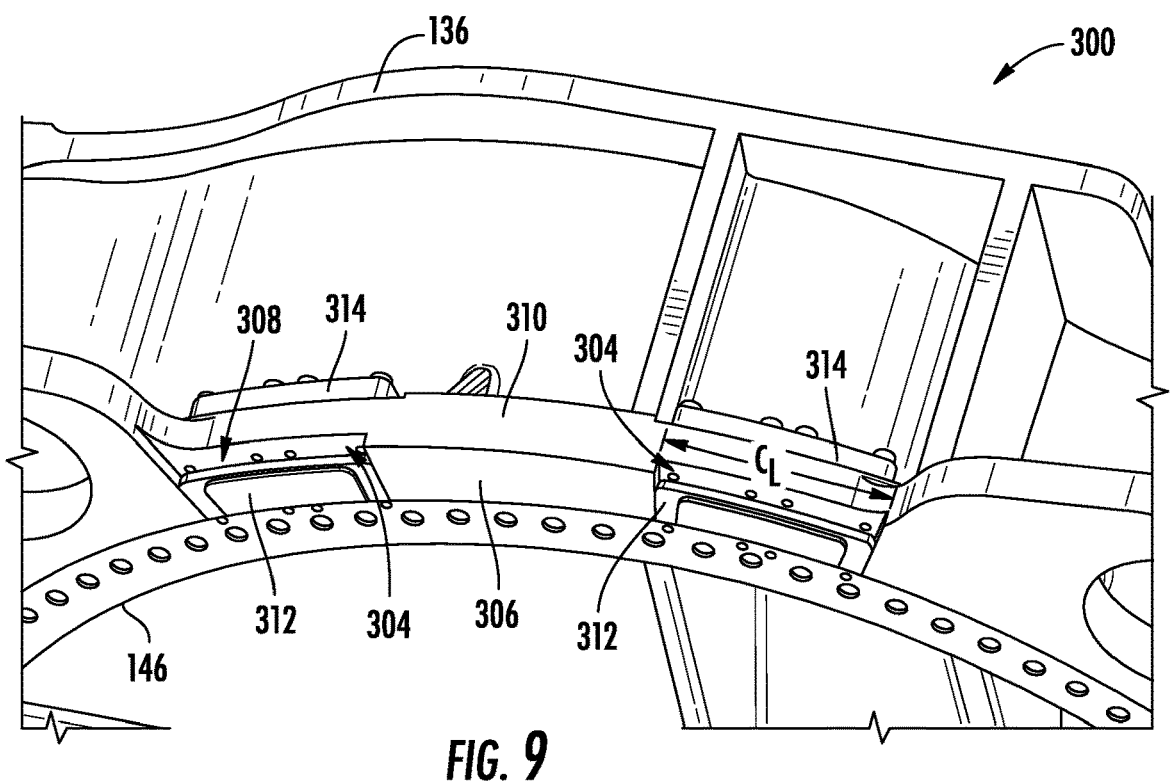
FIG. 9 illustrates an upward perspective view of a portion of an embodiment of a portion of the yaw braking assembly according to the present disclosure.
Figure 10:
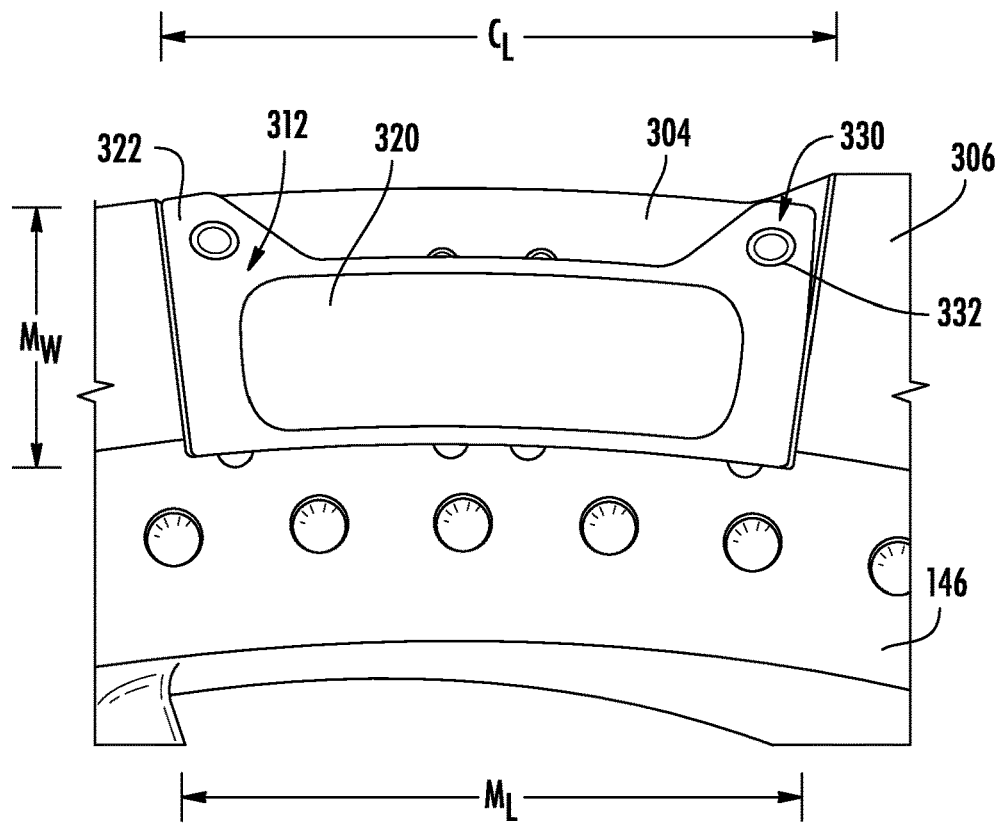
FIG. 10 illustrates a bottom view of an embodiment of a brake pad of the yaw brake assembly according to the present disclosure.

In at least one embodiment, such as depicted in FIGS. 5 and 8-12B, the plurality of brake pads 312 may have a non-circular shape. Additionally, in an embodiment, the plurality of recesses 304 may be formed to coincide to the non-circular shape of the plurality of brake pads 312. For example, as is depicted in FIG. 8, the brake pads 312 may be formed with a polygonal shape or rounded-square planform. In such an embodiment, the linear perimeter edges of the plurality of brake pads 312 may be configured to engage with corresponding edges of the plurality of recesses 304. As is depicted in FIGS. 9 and 10, in at least one embodiment, the plurality of brake pads 312 may be formed with a curvilinear polygonal shape. In other words, in such an embodiment, the brake pads 312 may be generally rectangular but may be formed to coincide with the circumference of the plurality of recesses 304. It should be appreciated that the yaw braking assembly 300 may include brake pads 312 having differing planforms.

It should also be appreciated that forming the plurality of recesses 304 coincide to the non-circular shape of the plurality of brake pads 312 may facilitate the transfer of braking loads from the of brake pads 312 to the bedplate support frame 136 by precluding the spin or rotation of the brake pads 312. As such, only one of the plurality of brake pads 312 may be positioned within each of the plurality of recesses 304. In other words, in at least one embodiment, the number of recesses 304 may equal the number of brake pads 312.

Figure 6:
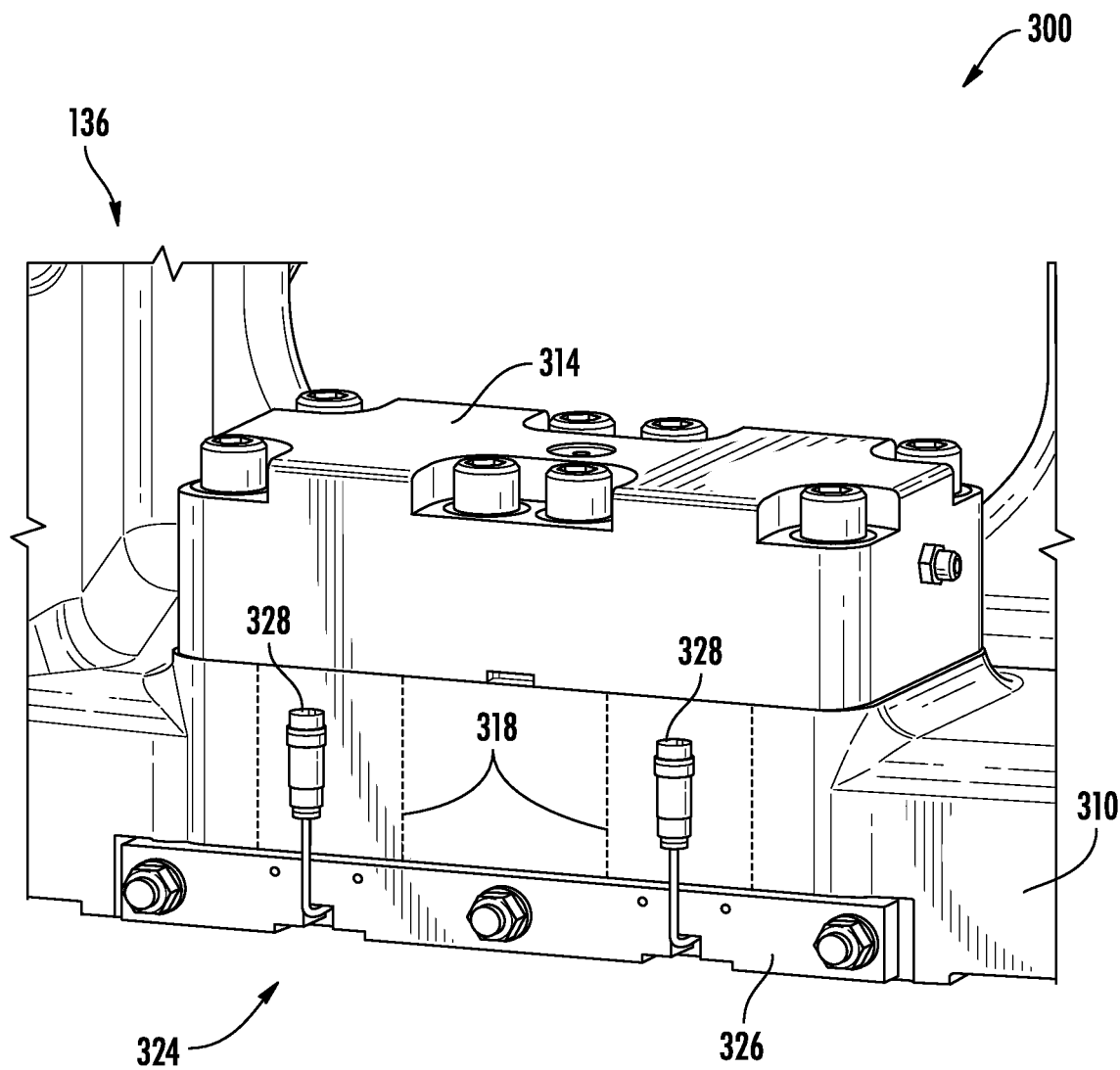
FIG. 6 illustrates a perspective view of an assembled portion of the yaw braking assembly according to the present disclosure.

In at least one embodiment, such as depicted in FIGS. 5 and 8, the plurality of recesses 304 and corresponding plurality of brake pads 312 may be distributed circumferentially about the annular flange 302 in a plurality of adjacent pair sets. In at least one embodiment, such as depicted in FIGS. 5 and 6, a single actuator 314 may be operably coupled to each of the plurality of pair sets 324. In such an embodiment, the number of actuators 314 may be half the number of brake pads 312 and recesses 304. It should be appreciated that employing a single actuator 314 to drive a pair set 324 may reduce the cost and complexity of the yaw braking assembly 300. It should be further appreciated that, in at least one embodiment, a mix of singular brake pads 312 and pair sets 324 may be utilized to develop the required braking force for the wind turbine 100.

In an embodiment, each of the plurality of brake pads 312 may define a maximal length ($M_L$) and a maximal width ($M_W$). In at least one embodiment, such as depicted in FIG. 10, the maximal length ($M_L$) may be greater than the maximal width ($M_W$). In an alternative embodiment, the maximal width ($M_W$) may be greater than the maximal length ($M_L$). In yet a further embodiment, the maximal length ($M_L$) and the maximal width ($M_W$) may have the same length.

In an embodiment, each open, exterior circumferential side 308 of the plurality of recesses 304 may define a circumferential length ($C_L$) which is sufficient to permit the passage of the corresponding brake pad 312. The passage of the corresponding brake pad 312 may be accomplished without requiring that the brake pad 312 be rotated or disassembled. For example, in at least one embodiment, the circumferential length ($C_L$) of the opening in the exterior circumferential side 310 of the annular flange 302 may be greater than the maximal length ($M_L$) of the corresponding brake pad 312. It should be appreciated that the ability to pass the brake pad 312 through the open, exterior circumferential side 308 of the recess 304 may facilitate the utilization of brake pads 312 having a pad surface area which may be larger than an actuator piston area. In other words, the brake pads 312 may be larger than the holes 318. It should further be appreciated that the utilization of brake pads 312 having a larger area may facilitate more controlled pad pressure, and thus may result in more desirable reliability and wear characteristics.

As depicted in FIGS. 6 and 8, in an embodiment, the yaw braking assembly 300 may include a retention bracket 326. The retention bracket 326 may be secured to the exterior circumferential side 310 of the annular flange 302. The retention bracket 326 may occlude at least one of the open, exterior circumferential sides 308 of the plurality of recesses 304. In such an embodiment, the retention bracket(s) 326 may be the only component of the wind turbine 100 which must be removed in order to access the brake pads 312. In an embodiment, the plurality of brake pads 312 may be accessible from outside of the bedplate support frame 136 via the corresponding open, exterior circumferential sides 308 of the plurality of recesses 304. For example, the yaw braking assembly 300 may permit the swapping of the brake pads 312 uptower, within the nacelle 106. In such an embodiment, this service may be accomplished without requiring the decoupling of the actuators 314 from the bedplate support frame 136. It should be appreciated that the ability to service the yaw braking assembly 300 while the yaw braking assembly 300 remains substantially installed, may reduce the cost and complexity of service operations.

Figure 12A:
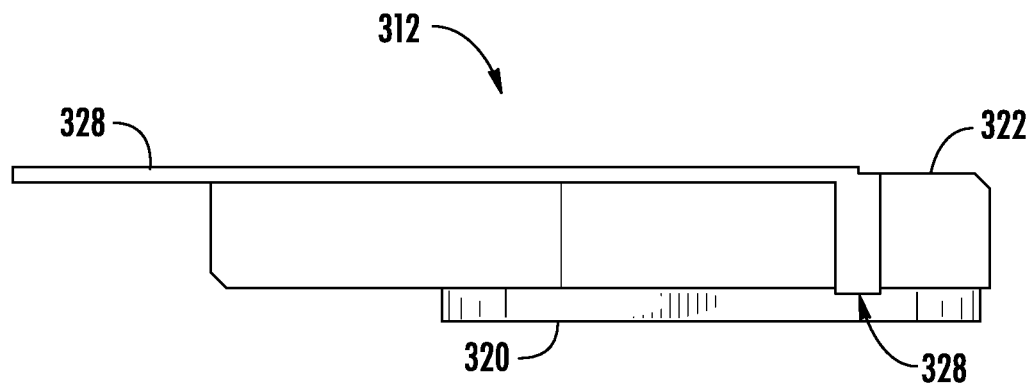
FIGS. 12A and 12B illustrate side and perspective views of embodiments of brake pads for utilization with the yaw braking assembly according to the present disclosure.
Figure 12B:
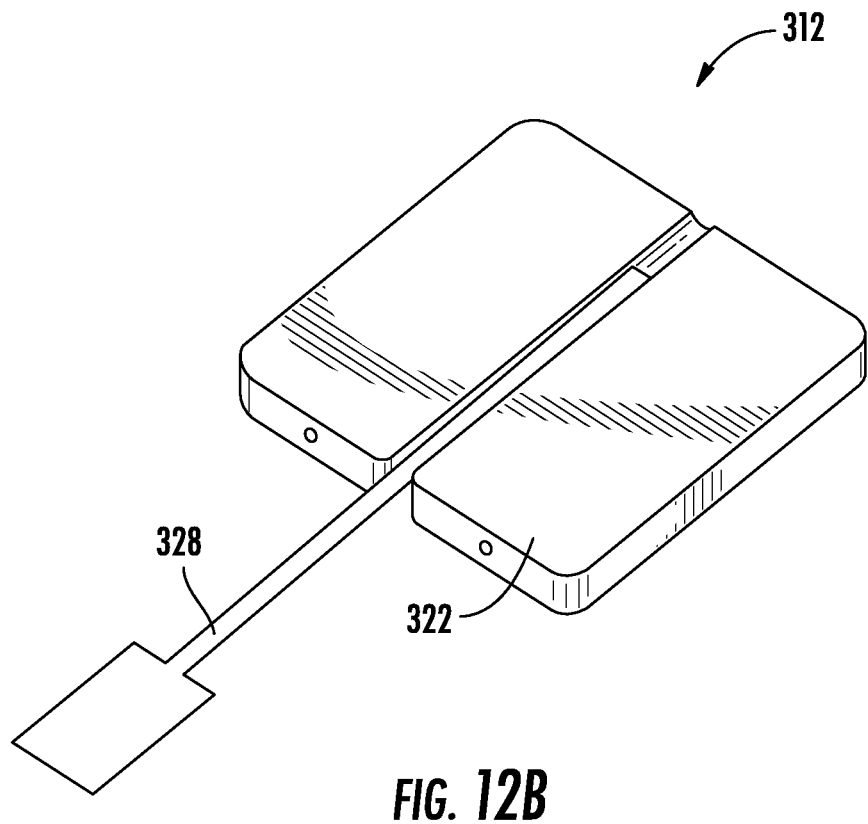

In an embodiment, such as depicted in FIGS. 8, 12A, and 12B, at least one of the plurality of brake pads 312 may include at least one sensor 328 configured to generate an alert relating to a wear level of one or more of the plurality of brake pads 312. The sensor(s) 328 may be configured to detect when a thickness of the wear layer 320 may be less than a predetermined threshold. In such an embodiment, the sensor(s) 328 may generate an alert when the thickness of the wear layer 320 crosses the threshold. The alert may, include a signal to the controller 114, a light, a sound, or other suitable device selected to alert an operator of the wear level of one or more of the plurality of brake pads 312. For example, in at least one embodiment, the sensor(s) 328 may be a continuity sensor. As the thickness of the wear layer 320 decreases, the sensor(s) 328 may be brought into contact with the yaw bearing 140, resulting in a disruption of the continuity of the sensor(s) 328. It should be appreciated that the inclusion of the sensor(s) 328 may permit the performance or scheduling of maintenance activities based on actual wear of the brake pads 312, rather than on a predetermined schedule. This may, in turn, preclude the performance of maintenance activities out of sync with the wear state of the brake pads 312.

Figure 11:
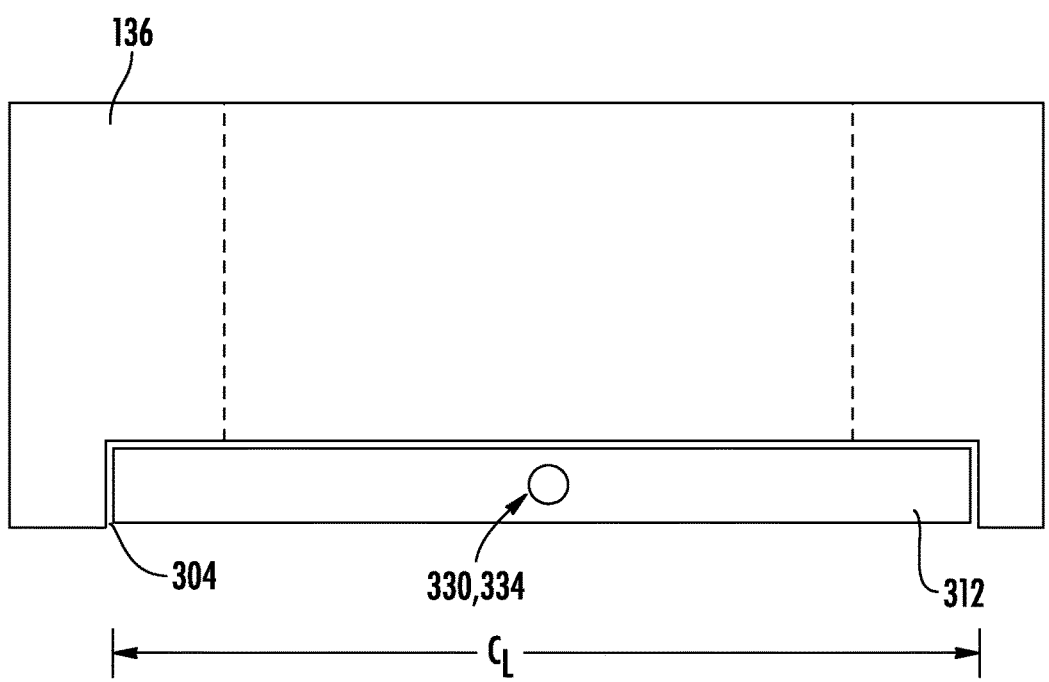
FIG. 11 illustrates a bottom view of an embodiment of a brake pad of the yaw brake assembly according to the present disclosure.

In a further embodiment, each of the plurality of brake pads 312 may be formed with at least one extraction feature 330. The extraction feature 330 may be positioned to facilitate the removal of each of the brake pads 312 from the corresponding recesses 304. For example, as shown in FIG. 10, the backer plate 322 may be formed with at least one protrusion 332. The protrusion 332 may define suitable features, such as holes, depressions, notches, and/or ridges, which may be engaged with the tool so as to affect the extraction of the brake pad 312 through the open, exterior circumferential side 308 of the corresponding recess 304. In an additional embodiment, such as depicted in FIG. 11, the backer plate 322 may be formed so as to define a threaded hole 334. In such an embodiment, a tool, fastener, or other similar implement may be threaded into the threaded hole 334 and utilized to extract the brake pad 312 through the open, exterior circumferential side 308 of the corresponding recess 304.

Figure 13:
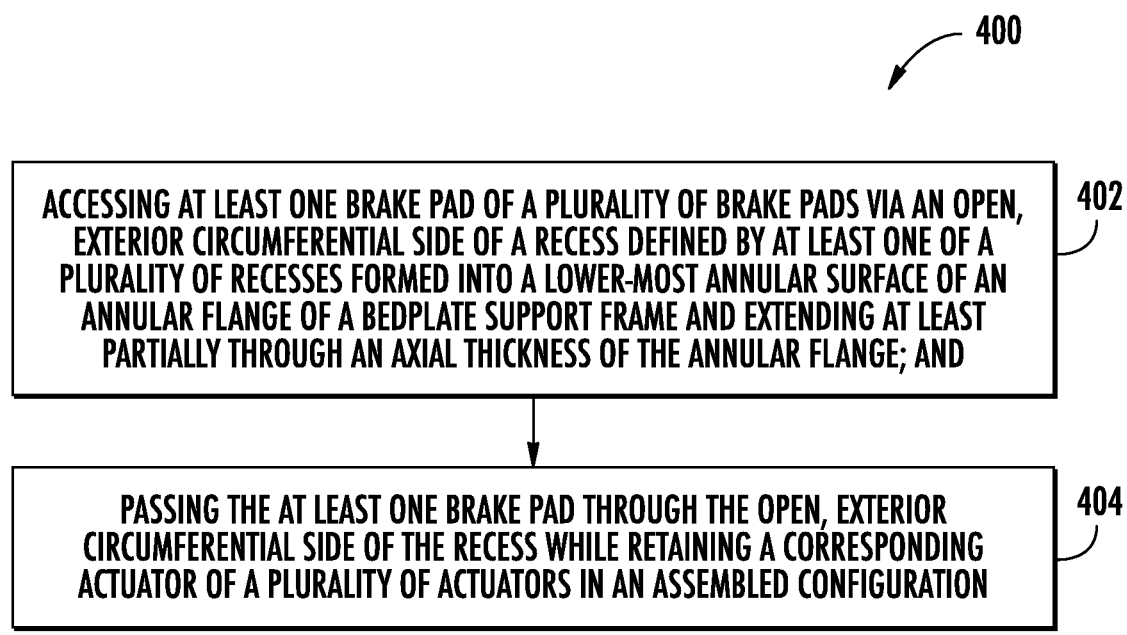
FIG. 13 illustrates a flowchart of a method for servicing a yaw braking assembly according to the present disclosure.

Referring now to FIG. 13, a flow diagram of one embodiment of a method 400 for servicing a braking assembly of a wind turbine is presented. The method 400 may be implemented using, for instance, the assembly 300 of the present disclosure discussed above with references to FIGS. 1-12B. FIG. 13 depicts steps performed in a particular order for purposes of illustration and discussion. Those of ordinary skill in the art, using the disclosures provided herein, will understand that various steps of the method 400, or any of the methods disclosed herein, may be adapted, modified, rearranged, performed simultaneously, or modified in various ways without deviating from the scope of the present disclosure.

As shown at (402), the method 400 may include accessing at least one brake pad of a plurality of brake pads via an open, exterior circumferential side of a recess defined by at least one of a plurality of recesses formed into a lower-most annular surface of an annular flange of a bedplate support frame and extending at least partially through an axial thickness of the annular flange. The lower-most annular surface may be disposed adjacent to a yaw bearing of the wind turbine. As shown at (404), the method 400 may also include passing the at least one brake pad through the open, exterior circumferential side of the recess while retaining a corresponding actuator of a plurality of actuators in an assembled configuration.

Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

Clause 1. A yaw braking assembly of a wind turbine, the yaw braking assembly comprising: a yaw bearing; a bedplate support frame comprising an annular flange arranged adjacent to the yaw bearing, the annular flange defining a plurality of recesses formed into a lower-most annular surface of the annular flange and extending at least partially through an axial thickness of the annular flange, each of the plurality of recesses defining an open, exterior circumferential side; a plurality of brake pads positioned within the plurality of recesses, each of the plurality of brake pads configured to engage at least one race of the yaw bearing; and a plurality of actuators for driving the plurality of brake pads to engage the at least one race of the yaw bearing so as to resist a yawing of a nacelle of the wind turbine.

Clause 2. The yaw braking assembly of any preceding clause, further comprising: a plurality of arm members positioned within a corresponding plurality of holes through the annular flange between the plurality of actuators and the plurality of brake pads, the plurality of arm members being oriented to transfer a force from the plurality of actuators to the plurality of brake pads.

Clause 3. The yaw braking assembly of any preceding clause, wherein each of the plurality of brake pads has a non-circular shape.

Clause 4. The yaw braking assembly of any preceding clause, wherein each of the plurality of brake pads has at least one of a polygonal shape, a curvilinear polygonal shape, or rounded-square planform.

Clause 5. The yaw braking assembly of any preceding clause, wherein each of the plurality of brake pads defines a maximal length and a maximal width, the maximal length being greater than the maximal width.

Clause 6. The yaw braking assembly of any preceding clause, wherein each open, exterior circumferential side of the plurality of recesses defines a circumferential length which is greater than the maximal length of the corresponding brake pad.

Clause 7. The yaw braking assembly of any preceding clause, wherein only one of the plurality of brake pads is positioned within each of the plurality of recesses.

Clause 8. The yaw braking assembly of any preceding clause, wherein the plurality of recesses and corresponding plurality of brake pads are distributed circumferentially about the annular flange in a plurality of adjacent pair sets.

Clause 9. The yaw braking assembly of any preceding clause, wherein a single actuator is operably coupled to each of the plurality of pair sets.

Clause 10. The yaw braking assembly of any preceding clause, wherein the plurality of brake pads are radially aligned with an outer race of the yaw bearing.

Clause 11. The yaw braking assembly of any preceding clause, further comprising a retention bracket secured to the exterior circumferential side, the retention bracket occluding at least one of the circumferential openings.

Clause 12. The yaw braking assembly of any preceding clause, wherein at least one of the plurality of brake pads further comprises at least one sensor configured to generate an alert relating to a wear level of one or more of the plurality of brake pads.

Clause 13. The yaw braking assembly of any preceding clause, wherein the at least one sensor comprises a continuity sensor.

Clause 14. The yaw braking assembly of any preceding clause, wherein the plurality of brake pads are accessible from outside of the bedplate support frame via the corresponding circumferential openings.

Clause 15. The yaw braking assembly of any preceding clause, wherein each of the plurality of brake pads is formed with at least one extraction feature, the extraction feature being positioned to facilitate the removal of each of the brake pads from the corresponding recesses.

Clause 16. A wind turbine, comprising: a tower; a nacelle mounted atop the tower and comprising a bedplate support frame, the bedplate support frame comprising an annular flange arranged adjacent to the yaw bearing, the annular flange defining a plurality of recesses formed into a lower-most annular surface of the annular flange and extending at least partially through an axial thickness of the annular flange, each of the plurality of recesses defining an open, exterior circumferential side, a yaw bearing arranged adjacent to the annular flange; a rotor mounted to the nacelle, the rotor comprising a rotatable hub having one or more rotor blades secured thereto; and a plurality of brake pads positioned within the plurality of recesses, each of the plurality of brake pads configured to engage at least one race of the yaw bearing; and a plurality of actuators for driving the plurality of brake pads to engage the at least one race of the yaw bearing so as to resist a yawing of a nacelle of the wind turbine.

Clause 17. The wind turbine of any preceding clause, wherein each of the plurality of brake pads comprises at least one of a polygonal shape, a curvilinear polygonal shape, or rounded-square planform.

Clause 18. The wind turbine of any preceding clause, wherein each of the plurality of brake pads defines a maximal length and a maximal width, the maximal length being greater than the maximal width.

Clause 19. The wind turbine of any preceding clause, wherein each circumferential opening defines a circumferential length that is greater than the maximal length of a corresponding brake pad of the plurality of brake pads.

Clause 20. A method for servicing a yaw braking assembly of a wind turbine, the method comprising: accessing at least one brake pad of a plurality of brake pads via an open, exterior circumferential side of a recess defined by at least one of a plurality of recesses formed into a lower-most annular surface of an annular flange of a bedplate support frame and extending at least partially through an axial thickness of the annular flange, wherein the lower-most annular surface is disposed adjacent to a yaw bearing of the wind turbine; and passing the at least one brake pad through the open, exterior circumferential side of the recess while retaining a corresponding actuator of a plurality of actuators in an assembled configuration.

What is claimed is:

1. A yaw braking assembly of a wind turbine, the yaw braking assembly comprising:
    a yaw bearing;
    a bedplate support frame comprising a flange arranged adjacent to the yaw bearing, the flange defining a plurality of recesses formed into a lower-most arcuate surface of the flange and extending at least partially through an axial thickness of the flange, each of the plurality of recesses defining an open, exterior circumferential side;
    a plurality of brake pads positioned within the plurality of recesses, each of the plurality of brake pads configured to engage at least one race of the yaw bearing; and
    a plurality of actuators for driving the plurality of brake pads to engage the at least one race of the yaw bearing so as to resist a yawing of a nacelle of the wind turbine.

2. The yaw braking assembly of claim 1, further comprising:
a plurality of arm members positioned within a corresponding plurality of holes through the flange between the plurality of actuators and the plurality of brake pads, the plurality of arm members being oriented to transfer a force from the plurality of actuators to the plurality of brake pads.

3. The yaw braking assembly of claim 1, wherein each of the plurality of brake pads has a non-circular shape.

4. The yaw braking assembly of claim 1, wherein each of the plurality of brake pads has at least one of a polygonal shape, a curvilinear polygonal shape, or rounded-square planform.

5. The yaw braking assembly of claim 1, wherein each of the plurality of brake pads defines a maximal length and a maximal width, the maximal length being greater than the maximal width.

6. The yaw braking assembly of claim 1, wherein each open, exterior circumferential side of the plurality of recesses defines a circumferential length which is greater than a maximal length of the corresponding brake pad.

7. The yaw braking assembly of claim 1, wherein only one of the plurality of brake pads is positioned within each of the plurality of recesses.

8. The yaw braking assembly of claim 7, wherein the plurality of recesses and corresponding plurality of brake pads are distributed circumferentially about the flange in a plurality of adjacent pair sets.

9. The yaw braking assembly of claim 8, wherein a single actuator is operably coupled to each of the plurality of pair sets.

10. The yaw braking assembly of claim 1, wherein the plurality of brake pads are radially aligned with an outer race of the yaw bearing.

11. The yaw braking assembly of claim 1, further comprising:
a retention bracket secured to the exterior circumferential side, the retention bracket occluding at least one of the circumferential openings.

12. The yaw braking assembly of claim 1, wherein at least one of the plurality of brake pads further comprises at least one sensor configured to generate an alert relating to a wear level of one or more of the plurality of brake pads.

13. The yaw braking assembly of claim 12, wherein the at least one sensor comprises a continuity sensor.

14. The yaw braking assembly of claim 1, wherein the plurality of brake pads are accessible from outside of the bedplate support frame via the corresponding circumferential openings.

15. The yaw braking assembly of claim 1, wherein each of the plurality of brake pads is formed with at least one extraction feature, the extraction feature being positioned to facilitate the removal of each of the brake pads from the corresponding recesses.

16. A wind turbine, comprising:
a tower;
a nacelle mounted atop the tower and comprising a bedplate support frame, the bedplate support frame comprising a flange, the flange defining a plurality of recesses formed into a lower-most arcuate surface of the flange and extending at least partially through an axial thickness of the flange, each of the plurality of recesses defining an open, exterior circumferential side;
a yaw bearing arranged adjacent to the flange;
a rotor mounted to the nacelle, the rotor comprising a rotatable hub having one or more rotor blades secured thereto; and
a plurality of brake pads positioned within the plurality of recesses, each of the plurality of brake pads configured to engage at least one race of the yaw bearing; and
a plurality of actuators for driving the plurality of brake pads to engage the at least one race of the yaw bearing so as to resist a yawing of a nacelle of the wind turbine.

17. The wind turbine of claim 16, wherein each of the plurality of brake pads comprises at least one of a polygonal shape, a curvilinear polygonal shape, or rounded-square planform.

18. The wind turbine of claim 16, wherein each of the plurality of brake pads defines a maximal length and a maximal width, the maximal length being greater than the maximal width.

19. The wind turbine of claim 18, wherein each circumferential opening defines a circumferential length that is greater than the maximal length of a corresponding brake pad of the plurality of brake pads.

20. A method for servicing a yaw braking assembly of a wind turbine, the method comprising:
accessing at least one brake pad of a plurality of brake pads via an open, exterior circumferential side of a recess defined by at least one of a plurality of recesses formed into a lower-most arcuate surface of a flange of a bedplate support frame and extending at least partially through an axial thickness of the flange, wherein the lower-most arcuate surface is disposed adjacent to a yaw bearing of the wind turbine; and
passing the at least one brake pad through the open, exterior circumferential side of the recess while retaining a corresponding actuator of a plurality of actuators in an assembled configuration.

* * * * *